(12) United States Patent
Ohashi

(10) Patent No.: US 7,053,941 B1
(45) Date of Patent: May 30, 2006

(54) IMAGE INPUT APPARATUS

(75) Inventor: Kazuhito Ohashi, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 09/639,082

(22) Filed: Aug. 16, 2000

(30) Foreign Application Priority Data

Aug. 19, 1999 (JP) .................................. 11-232463
Jan. 26, 2000 (JP) ............................... 2000-016949

(51) Int. Cl.
*H04N 9/64* (2006.01)

(52) U.S. Cl. ...................................... 348/243; 348/251

(58) Field of Classification Search ................. 348/251, 348/245, 243, 257; 358/529, 463, 461, 474, 358/482, 483, 497
See application file for complete search history.

(56) References Cited

U.S. PATENT DOCUMENTS

| | | | | |
|---|---|---|---|---|
| 4,985,629 A | * | 1/1991 | Horikawa | 250/585 |
| 5,233,414 A | | 8/1993 | Kojima | 358/80 |
| 5,267,053 A | | 11/1993 | Potucek et al. | 358/446 |
| 5,289,286 A | * | 2/1994 | Nakamura et al. | 348/223.1 |
| 5,659,355 A | * | 8/1997 | Barron et al. | 348/245 |
| 5,717,459 A | | 2/1998 | Maki et al. | 348/312 |
| 5,750,985 A | | 5/1998 | Suzuki | 250/234 |
| 5,838,463 A | | 11/1998 | Gahang | 358/465 |
| 5,917,620 A | | 6/1999 | Hasegawa et al. | 358/513 |
| 5,940,125 A | | 8/1999 | Suganuma | 348/243 |
| 6,034,789 A | * | 3/2000 | Kawai | 358/474 |
| 6,330,083 B1 | * | 12/2001 | Nabeshima et al. | 358/474 |
| 6,337,713 B1 | | 1/2002 | Sato | 348/311 |
| 6,433,823 B1 | | 8/2002 | Nakamura et al. | 348/254 |
| 6,480,228 B1 | | 11/2002 | Yoshihara et al. | 348/312 |

FOREIGN PATENT DOCUMENTS

| | | |
|---|---|---|
| EP | 0 501 333 A2 | 9/1992 |
| EP | 0 784 397 A2 | 7/1997 |
| JP | 63-052575 | 3/1988 |
| JP | 02-148972 | 6/1990 |
| JP | 04-113766 | 4/1992 |
| JP | 5-022597 | 2/1993 |
| JP | 05-227427 | 9/1993 |
| JP | 05-292242 | 11/1993 |
| JP | 05-328039 | 12/1993 |
| JP | 7-30820 | 1/1995 |
| JP | 07-038814 | 2/1995 |
| JP | 07-203154 | 8/1995 |
| JP | 9-23384 | 1/1997 |
| JP | 09-051410 | 2/1997 |
| JP | 09-298647 | 11/1997 |
| JP | 10065973 | 3/1998 |
| JP | 10336529 | 12/1998 |
| JP | 11-261760 | 9/1999 |
| JP | 11-289432 | 10/1999 |

* cited by examiner

*Primary Examiner*—David Ometz
*Assistant Examiner*—Yogesh Aggarwal
(74) *Attorney, Agent, or Firm*—Fitzpatrick, Cella, Harper & Scinto

(57) ABSTRACT

An image input apparatus has an image sensor for photoelectrically converting image information of an object into an electric signal and outputting the signal, and a correction circuit for adjusting a fluctuation of offset components generated during photoelectric conversion contained in the signal output from the image sensor to correct the offset components. Images of good quality can be obtained by correcting the offset components contained in the signal output from the image sensor.

5 Claims, 17 Drawing Sheets

UPDATING ONLY BLOCK WHOSE UPDATE DATA WAS OBTAINED

IMAGE INPUT APPARATUS

BACKGROUND OF THE INVENTION

1. Field of the Invention

The present invention relates to an image input apparatus for forming image information of an object through photoelectric conversion.

2. Related Background Art

An image input apparatus using a linear image sensor is known.

FIG. 1 shows the structure of a linear CCD image sensor used in a conventional image input apparatus.

In FIG. 1, reference numeral 101 represents a light receiving pixel array of a linear CCD image sensor. Reference numeral 102 represents an analog shift register for sequentially reading electric charges accumulated in odd pixels of the pixel array, and reference numeral 103 represents an analog shift register for sequentially reading electric charges accumulated in even pixels of the pixel array. Reference numerals 104 and 105 represent output amplifiers for converting the electric charges read by the analog shift registers 102 and 103 into voltage signals.

Electric charges of the pixel array 101 of the linear CCD image sensor shown in FIG. 1 are read by grouping the pixels into even and odd pixels, in order to obtain a read speed higher than a predetermined speed, because the analog shift registers 102 and 103 have a limit in the transfer speed.

An image input apparatus having a read speed higher than that of a conventional linear CCD image sensor of an even/odd separation read type such as shown in FIG. 1 has been desired.

A linear CCD image sensor capable of realizing a read speed two times as fast as that of a linear CCD image sensor of an odd/even separation read type has been proposed. As shown in FIG. 3, this linear CCD image sensor has a right/left division read structure in addition to an even/odd separation read structure.

The linear CCD image sensor shown in FIG. 3 has four analog shift registers 302 to 305 to read electric charges from a light receiving pixel array by dividing them into right and left pixels and grouping each of the right and left pixels into even and odd pixels.

The linear CCD image sensor of the right/left division type shown in FIG. 3 is, however, associated with the following problem.

A level of each of the read signals of right/left four channels becomes different at the boundary between the right and left pixels if an offset of read signal of each channel has a different offset level.

In a conventional linear CCD image sensor of the even/odd separation read type, even if there is a signal level difference between even/odd pixels, only a very fine repetitive pattern appears on an image. However, in a linear CCD image sensor of the right/left division read type, even if difference between a read signal levels of the four channels is very small, a visually conspicuous line appears on an image at the right/left boundary.

Such offset levels can be corrected by proper means.

Such correction is performed once prior to reading an original, and thus the following problem occurs. An offset level fluctuates during the original read operation because of temperature change in a CCD sensor, analog circuits, video circuits and the like. Therefore, the read signal level fluctuates as shown in FIG. 2. This fluctuation causes clear difference in a signal level between the right and left images picked up with an image input apparatus using a linear CCD image sensor of the right/left division read type.

SUMMARY OF THE INVENTION

It is an object of the invention to correct offset components contained in signals and obtain an image of good quality.

In order to achieve the above object, one aspect of the invention provides an image input apparatus comprising: photoelectric conversion means for acquiring image information of an object and outputting a signal; and correcting means for correcting offset components contained in the signals output from the photoelectric conversion means, wherein the correcting means adjusts a fluctuation of the offset components generated during acquiring image information.

Another aspect of the invention provides an image input apparatus comprising: photoelectric conversion means for acquiring image information of an object and outputting signals; and correcting means for correcting offset components contained in the signals output from the photoelectric conversion means, in accordance with the signals output from the photoelectric conversion means during image information acquiring and the signals output from the photoelectric conversion means during a period other than the image information acquiring.

Another aspect of the invention provides an image input apparatus comprising: photoelectric conversion means for acquiring image information of an object with dividing the image information into a reference area and at least one other area, and outputting a signal from each of a plurality of output units corresponding to the areas; and adjusting means for adjusting a signal level of an output signal from the one other area so as to make equal substantially to a signal level of an output signal from the reference area, in accordance with the signals from the reference area and the other area.

Another aspect of the invention provides an image processing method of processing signals output from photoelectric conversion means for acquiring image information of an object and outputting the signals, comprising a step of correcting offset components contained in the signals output from the photoelectric conversion means, wherein the correcting step includes a step of adjusting a fluctuation of the offset components generated during acquiring image information.

Another aspect of the invention provides an image processing method of processing signals output from the photoelectric conversion means for acquiring image information of an object and outputting the signals, comprising a step of: correcting offset components contained in the signals output from the photoelectric conversion means, in accordance with the signals output from the photoelectric conversion means during image information acquiring and the signals output from the photoelectric conversion means during a period other than the image information acquiring.

Another aspect of the invention provides an image processing method of processing a signal output from photoelectric conversion means for acquiring image information of an object with dividing the image information into a reference area and at least one other area, and outputting a signal from each of a plurality of output units corresponding to the areas, comprising a step of adjusting a signal level of an output signal from the one other area so as to make equal substantially to a signal level of an output signal from the reference area, in accordance with the signals from the reference area and the other area.

Another aspect of the invention provides a storage medium storing a program for processing signals output from photoelectric conversion means for acquiring image information of an object and outputting the signals, the program comprising a code of correcting offset components contained in the signals output from the photoelectric conversion means, wherein the code includes a code of adjusting a fluctuation of the offset components generated during acquiring image information.

Another aspect of the invention provides a storage medium storing a program for processing signals output from photoelectric conversion means for acquiring image information of an object and outputting the signals, the program comprising a code of correcting offset components contained in the signals output from the photoelectric conversion means, in accordance with the signals output from the photoelectric conversion means during image information acquiring and the signals output from the photoelectric conversion means during image a period output from photoelectric conversion means during a period other than the image information acquiring.

Another aspect of the invention provides a storage medium storing a program for processing a signal output from photoelectric conversion means for acquiring image information of an object with dividing the image information into a reference area and at least one other area, and outputting a signal from each of a plurality of output units corresponding to the areas, the program comprising a code of adjusting a signal level of an output signal from the one other area so as to make equal substantially to a signal level of an output signal from the reference area, in accordance with the signals from the reference area and the other area.

Another aspect of the invention provides an image input system comprising: an original support for placing an original thereon; an illumination lamp for illuminating the original placed on the original support; the image input apparatus described above; a lens for focussing light reflected from the original illuminated with the illumination lamp on the image input apparatus; and a plurality of mirrors for guiding the light reflected from the original to the lens.

Other objects and features of the present invention will become apparent from the following detailed description of embodiments when read in conjunction with the accompanying drawings.

DETAILED DESCRIPTION OF THE PREFERRED EMBODIMENTS

A first embodiment of the invention will be described with reference to FIGS. 3 to 7.

Figure 1:
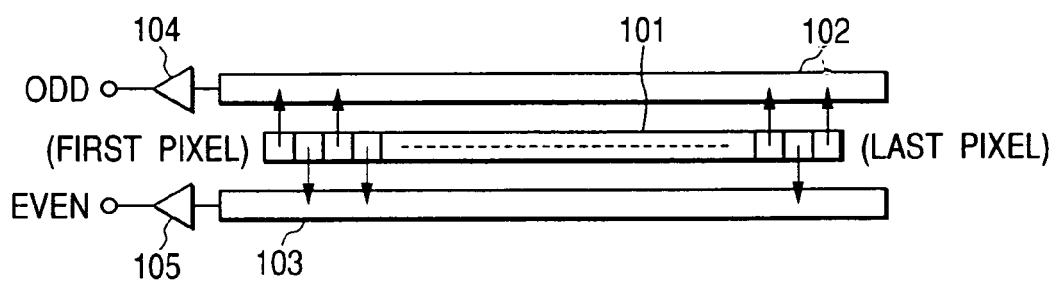
FIG. 1 is a diagram showing a conventional CCD sensor.
Figure 2:
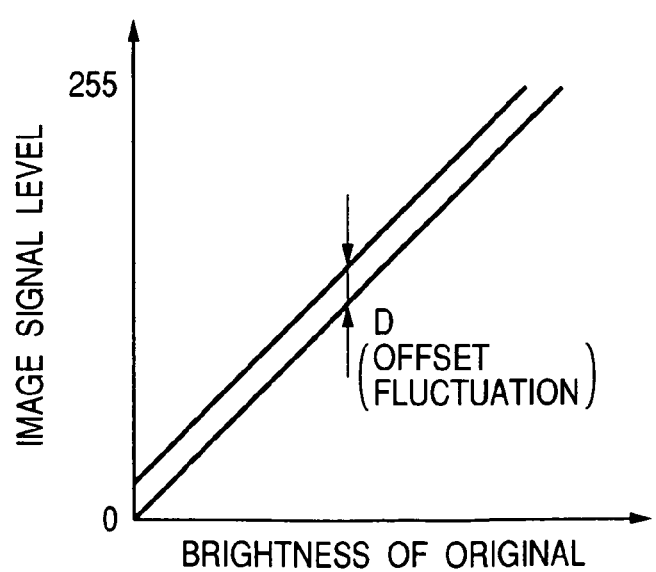
FIG. 2 is a graph illustrating a problem associated with conventional techniques.
Figure 3:
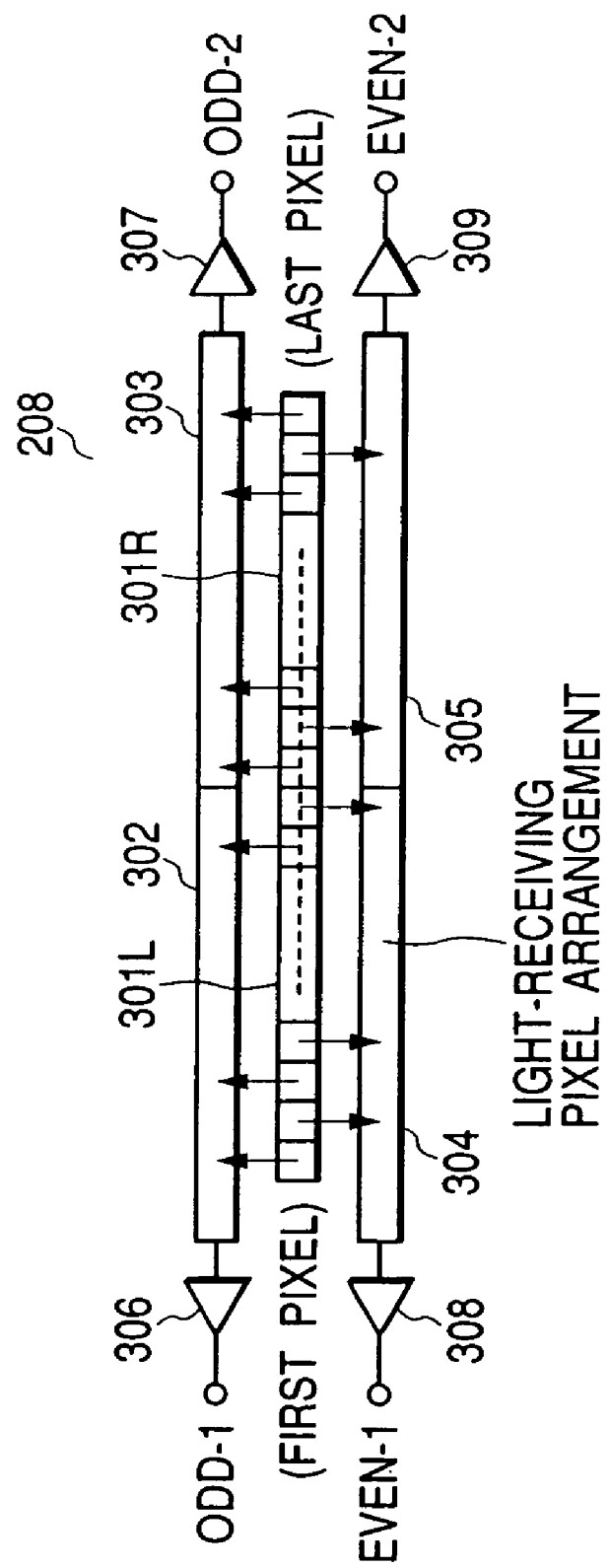
FIG. 3 is a diagram showing a right/left division read type CCD sensor used by first to fifth embodiments of the invention.
Figure 4:
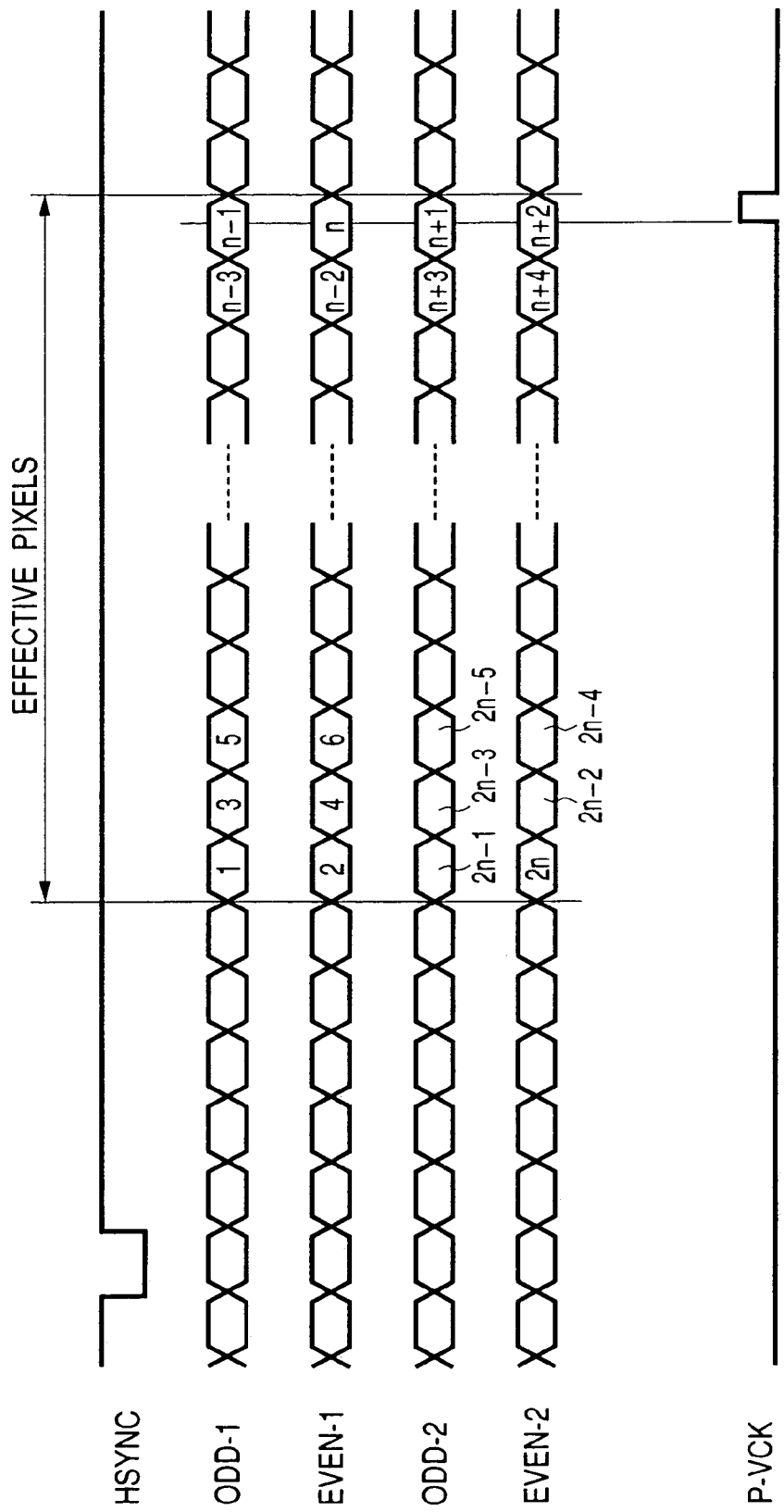
FIG. 4 is a diagram showing image signals output from a right/left division read type CCD sensor.

FIG. 3 is a diagram showing the structure of a linear CCD image sensor 208 of a right/left division read type to be used as photoelectric conversion means.

In FIG. 3, reference numeral 301 represents a light receiving pixel array or arrangement. Reference numerals 302, 303, 304 and 305 represent an analog shift register (reading means). Reference numerals 306, 307, 308 and 309 represent an output amplifier for converting electric charges read from each of the analog shift registers 302 to 305 into a voltage signal.

This image sensor 208 reads electric charges by dividing pixels into even and odd pixels and by dividing the light receiving pixel array 301 of the image sensor 208 into right and left pixel subarrays 301R and 301L at the halfway position of the array 301. Electric charges accumulated in the left pixel subarray 301L are output from the output amplifier 306 for odd pixels and from the output amplifier 308 for even pixels, respectively as pixel signals ODD-1 and EVEN-1. Similarly, electric charges accumulated in the right pixel subarray 301R are output from the output amplifier 307 for odd pixels and from the output amplifier 309 for even pixels, respectively as pixel signals ODD-2 and EVEN-2.

Figure 5:
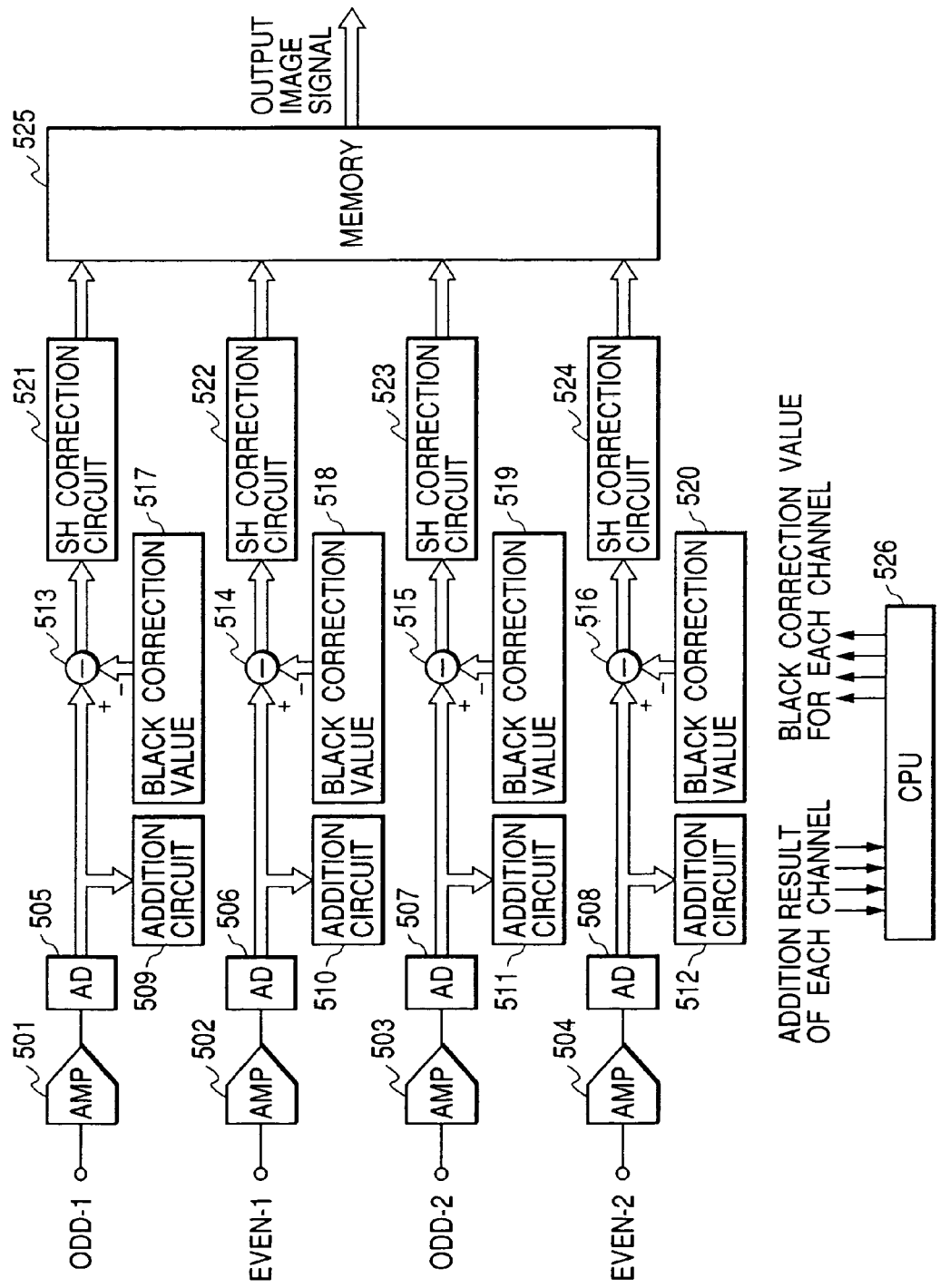
FIG. 5 is a diagram showing the structure of a processing unit according to first and second embodiments of the invention.

FIG. 5 is a block diagram showing the structure of a signal processing unit of the image input apparatus.

In FIG. 5, reference numerals 501 to 504 represent an amplifier for amplifying each output of the linear CCD image sensor of the right/left division read type used as photoelectric conversion means shown in FIG. 3. Reference numerals 505 to 508 represent an AD converter for converting an output of each of the output amplifiers 501 to 504 into a digital signal. Reference numerals 509 to 512 represent an adder circuit used as adding means for adding image signals of each channel during an optional period. Reference numerals 513 to 516 represent a subtractor circuit used as subtracting means for subtracting a black offset component from an image signal of each channel. Reference numerals 517 to 520 represent a black correction value setting register used for adjusting means for setting the black offset component. Reference numerals 521 to 524 represent a shading correction circuit for executing a shading correction process of the image signal of each channel. Reference numeral 525 represents a memory circuit used for rearranging the order (shown in FIG. 4) of image signals output from the linear CCD image sensor of the right/left division read type into a predetermined order. Reference numeral 526 represents a CPU for controlling the adder circuits, black correction value setting registers and the like.

The adder circuits, subtractor circuits and black correction value setting registers constitute correcting means for correcting an offset component by adjusting a fluctuation of the offset component contained in each image signal output of the linear CCD image sensor. The offset component fluctuation occurs while image information of an object such as an original is picked up.

Next, the operation of the image input apparatus of the first embodiment will be described with reference to the flow chart shown in FIG. 7.

Figure 7:
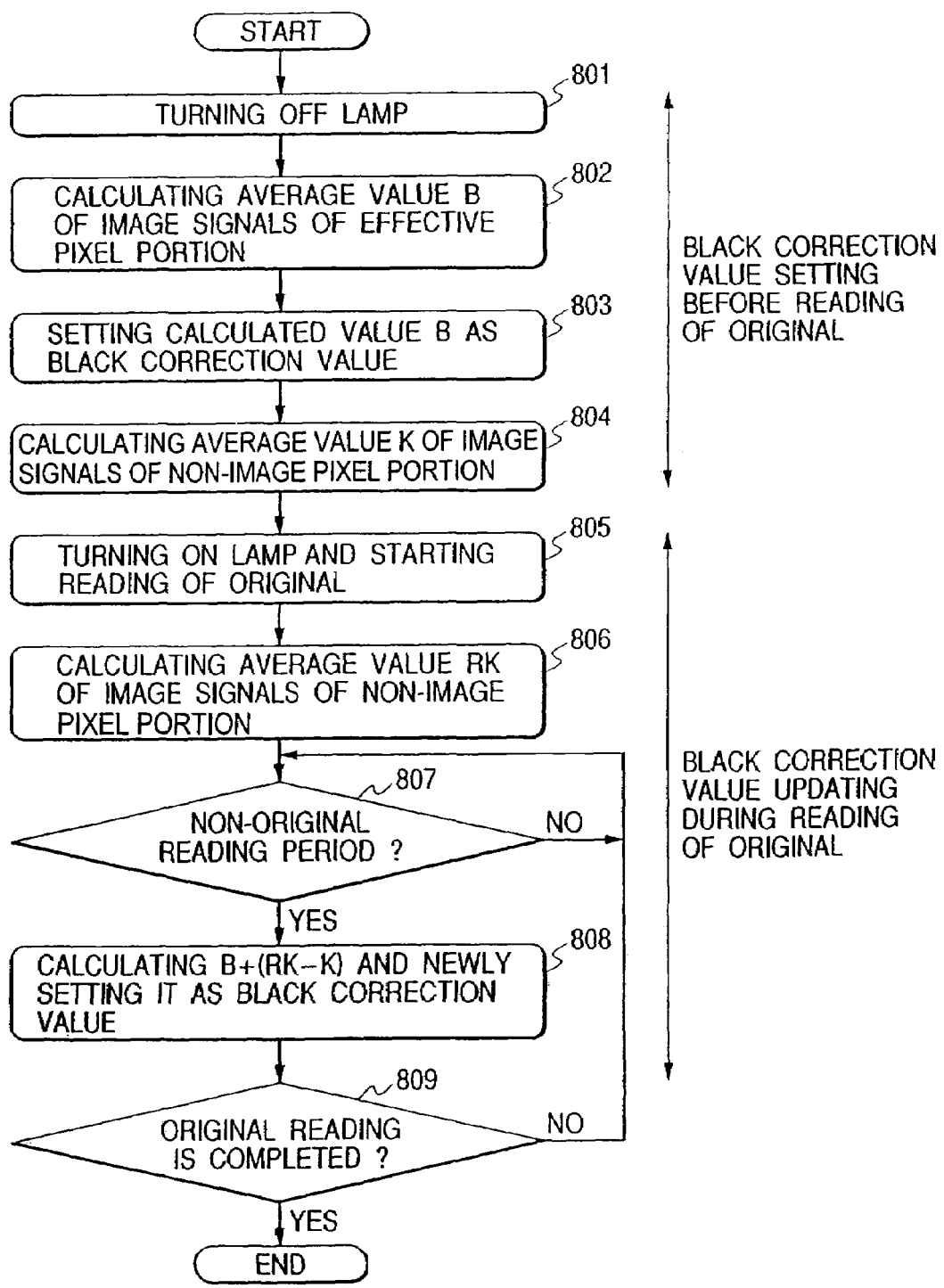
FIG. 7 is a flow chart illustrating the operation of the image input apparatus according to the first embodiment.

The flow chart shown in FIG. 7 includes two parts, one is a process of setting a black offset correction value to be executed before an original read operation, and the other is a process of updating (changing) a black offset correction value to be executed during an original read operation.

Figure 6:
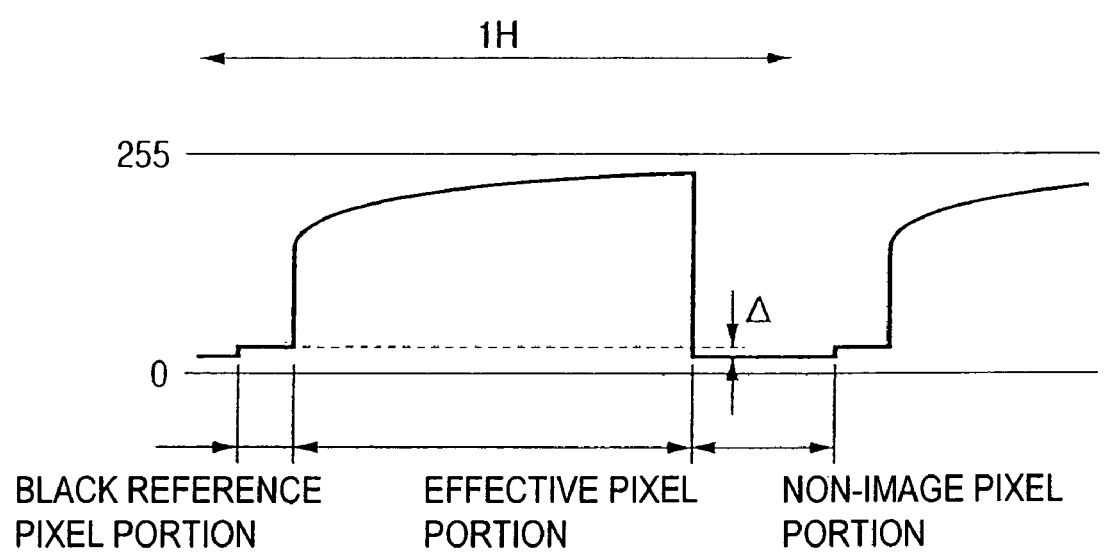
FIG. 6 is a diagram showing an image signal illustrating the first and second embodiments.

FIG. 6 shows an example of an image signal of one line (during 1H). For the black offset correction value setting to be executed before the original read operation, an image signal (indicated by a broken line in FIG. 6) while a lamp is turned off is used. For the black offset correction value updating to be executed during the original read operation, a signal of non-image pixel portion (during a non-image period) is used.

Reverting to FIG. 7, at Step 801 the lamp is turned off. At Step 802 each of the adder circuits 509 to 512 calculates an average value B of image signals of effective pixels. This average value B of pixel signals in a lamp turn-off state is set as a black offset correction value at Step 803.

Next, while the lamp is turned off, at Step 804 an average value K of pixel signals of the non-image pixel portion is calculated by the adder circuits 509 to 512.

At Step 805, the lamp is turned on to start reading an original.

At step 806, while the lamp is turned on, an average value RK of pixel signals of the non-image pixel portion is calculated by the adder circuits 509 to 512. At Step 807 it is checked whether the period is a non-original reading period (a period from the end of reading one original to the start of reading another original). If during the non-original reading period, at Step 808 each of the black value offset setting registers 517 to 520 updates (changes) the black correction value to correct any change in the black correction value during reading the previous original and prevent a change in the image quality caused by such change.

The updated black correction value is "B+(RK−K)" which cancels out an offset fluctuation changing every moment.

As shown in FIG. 6, there is a small level difference Δ(shown in FIG. 7) between the level of an image signal output from the effective pixels during a lamp turn-off state and the level of a signal output from the non-image pixel portion. This difference results from the dark current in the pixels (photodiodes) in the CCD light reception area, which dark current is accumulated during the light reception period (accumulation time). However, the linear CCD sensor of the right/left division read type has a very short accumulation time because of a read operation at high speed. Therefore, this difference is almost constant.

Therefore, the black offset of an image signal can be corrected reliably by updating (changing) the black correction value by using signals output from the non-image pixel portion.

If a signal in a black reference pixel portion shown in FIG. 6 is used instead of using a signal from the non-image pixel portion, a precision of black correction may be lowered more or less because a signal from the black reference pixel portion contains, in many cases, clamp pulse noises (such as crosstalk from a clamp pulse) generated in an analog circuit such as a clamp circuit at the stage before the AD converters. If clamp pulse noises are not contained, a signal from the black reference pixel portion can be used for black correction at a high precision, similar to a signal from the non-image pixel portion.

A second embodiment of the invention will be described. In the second embodiment, a method of calculating an updated value for updating (changing) the black correction value is different from the first embodiment. The other structure and operation are same as the first embodiment.

Figure 8:
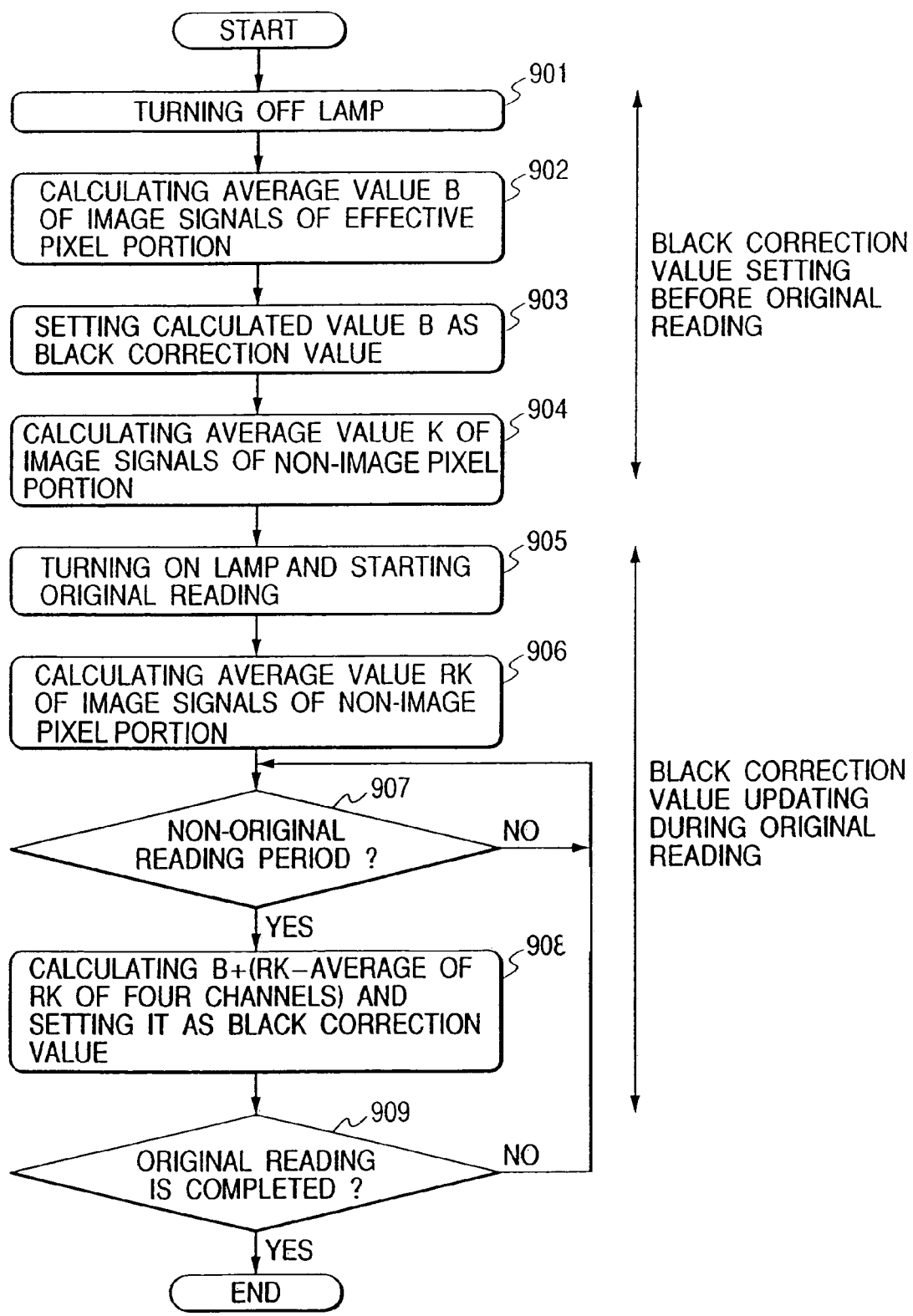
FIG. 8 is a flow chart illustrating the operation of the image input apparatus according to the second embodiment.

FIG. 8 is a flow chart illustrating the operation of an image input apparatus of the second embodiment.

In the first embodiment, the updated value for updating (changing) the black correction value is set at Step 808 by using a difference between the average value RK of pixel signals in the non-image pixel portion in the lamp turn-on state and the average value K in the non-image pixel portion in the lamp turn-off state. In the second embodiment, the updated value for updating (changing) the black correction value is set at Step 908 by using a difference between the average value RK of pixel signals in the non-image pixel portion in the lamp turn-on state and an average value of RK values of the non-image pixel portion of four channels in the lamp turn-on state.

In the first and second embodiments, although a linear CCD image sensor is used as photoelectric 32 conversion means, other sensors such as a MOS type sensor may also be used with advantageous effects similar to those described above.

Other updated values may be used if they can adjust a fluctuation of an offset component during reading image information of an object.

Although a linear CCD image sensor of the right/left division read type is used, other image sensors without the right/left division read structure may also be used. For example, an image sensor having a MOS transistor for amplifying a signal of a photodiode of each pixel may be used. Such the image sensor has a relatively large variation in the performance of MOS transistors and thus requires to correct such the variation. However, an image of good quality can be obtained by applying the first or second embodiment to this MOS image sensor. Namely, correcting means corrects an offset component by adjusting a fluctuation of the offset component contained in a signal output from photoelectric conversion means during picking up image information of an object.

Figure 9:
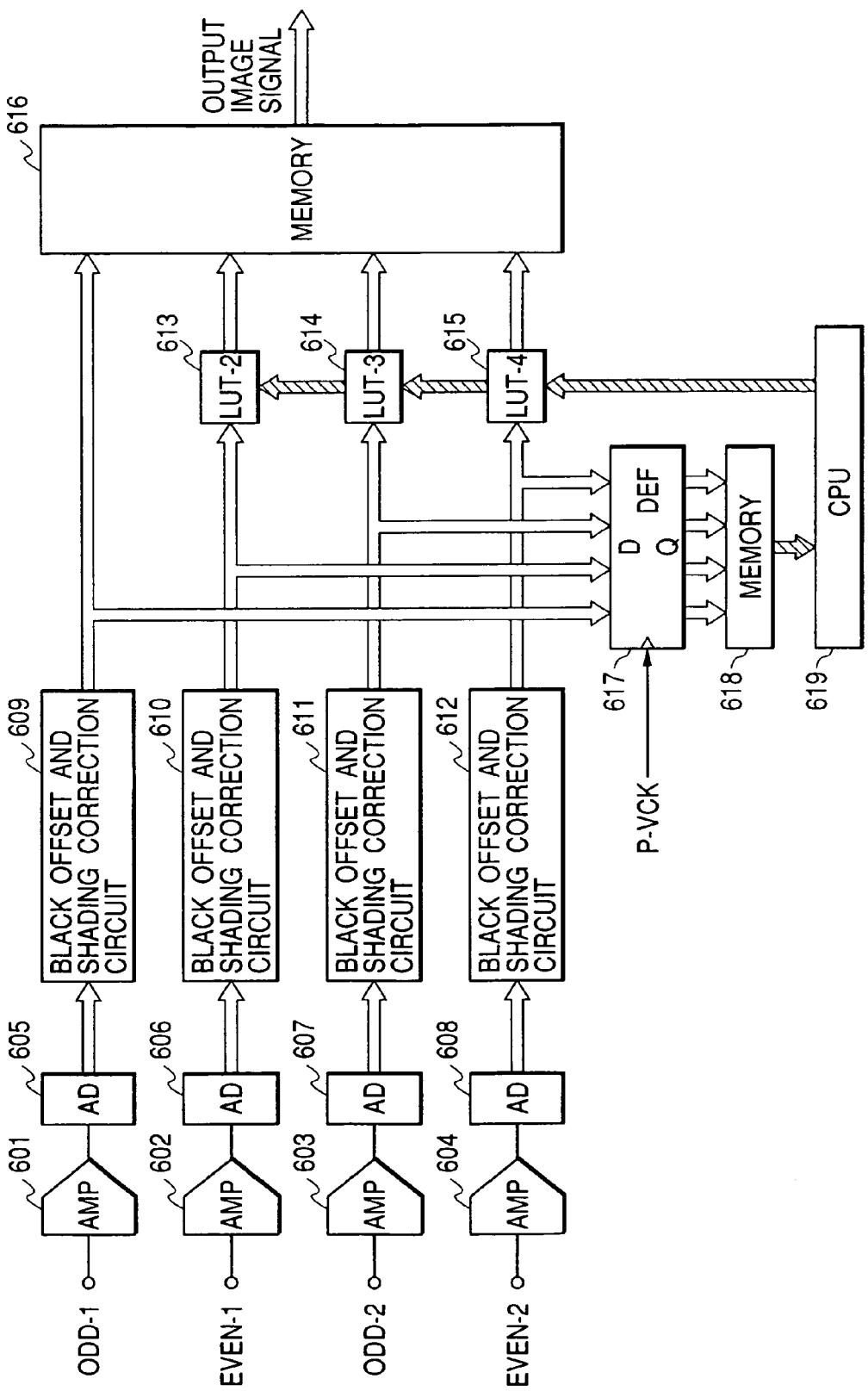
FIG. 9 is a diagram showing the structure of a processing unit of an image input apparatus according to a third embodiment of the invention.

FIG. 9 is a block diagram showing the structure of a processing unit of an image input apparatus according to a third embodiment of the invention.

Signals from the image sensor 208 described with FIG. 3 are input to amplifiers 601, 602, 603 and 604 respectively. The amplifiers 601 to 604 are connected via respective A/D convertor circuits 605 to 608 to black offset and shading correction circuits 609 to 612. The black offset and shading correction circuits 609 to 612 are connected via a respective D-type flip flop (DFF) 617 and a memory 618 to a CPU 619 (adjusting means, presuming means). The black offset and shading correction circuit 609 is also connected to a memory 616, and the black offset and shading correction circuits 610 to 612 are also connected via respective halfway correcting circuits 613 to 615 (adjusting means, correcting means) to the memory 616.

Voltage signals (output pixel signals ODD-1, EVEN-1, ODD-2, EVEN-2) from the output amplifiers 306 to 309 shown in FIG. 3 are input to and amplified by the amplifiers 601 to 604, converted into digital signals by the A/D convertor circuits 605 to 608, and subjected to a black offset correction process for subtracting the black offset and a shading correction process by the black offset and shading correction circuits 609 to 612.

The halfway correcting circuits 613 to 615 change the level of each of the output pixel signals EVEN-1, ODD-2 and EVEN-2 relative to the level of the output pixel signal ODD-1, which is used as a reference, by using look-up tables LUT-2, LUT-3 and LUT-4 to be later described, to thereby realize a halfway correction of the image sensor of the right/left division read type (read level correction). The halfway correcting circuits 613 to 615 not only execute the halfway correction but also provide a linearity correction function. Because of the order of the process, the halfway correcting circuits 613 to 615 are disposed at the back stages of the black offset and shading correction circuits 610 to 612. Therefore, the constant read linearity can be obtained irrespective of the pixel position during the main scan.

The memory 616 is used for temporarily storing respective pixel signals output at timings to be later described with reference to FIG. 10, and for rearranging the positions of pixel signals to make them have a correct pixel order.

DFF 617 and memory 618 provide a temporary storage function in order to allow CPU 619 to fetch pixel data at the halfway position to be later described with reference to FIG. 10 (indicated as a leading edge position P-VCK). CPU 619 fetches pixel data stored in the memory 618 a plurality of times while an original is read, and determines the values to be set to the halfway correction look-up tables LUT-2, LUT-3 and LUT-4 by executing a calculation operation (a look-up table (LUT) setting process illustrated in FIG. 12) to be described later. A program to be executed by CPU 619 is stored in an unrepresented ROM.

Figure 10:
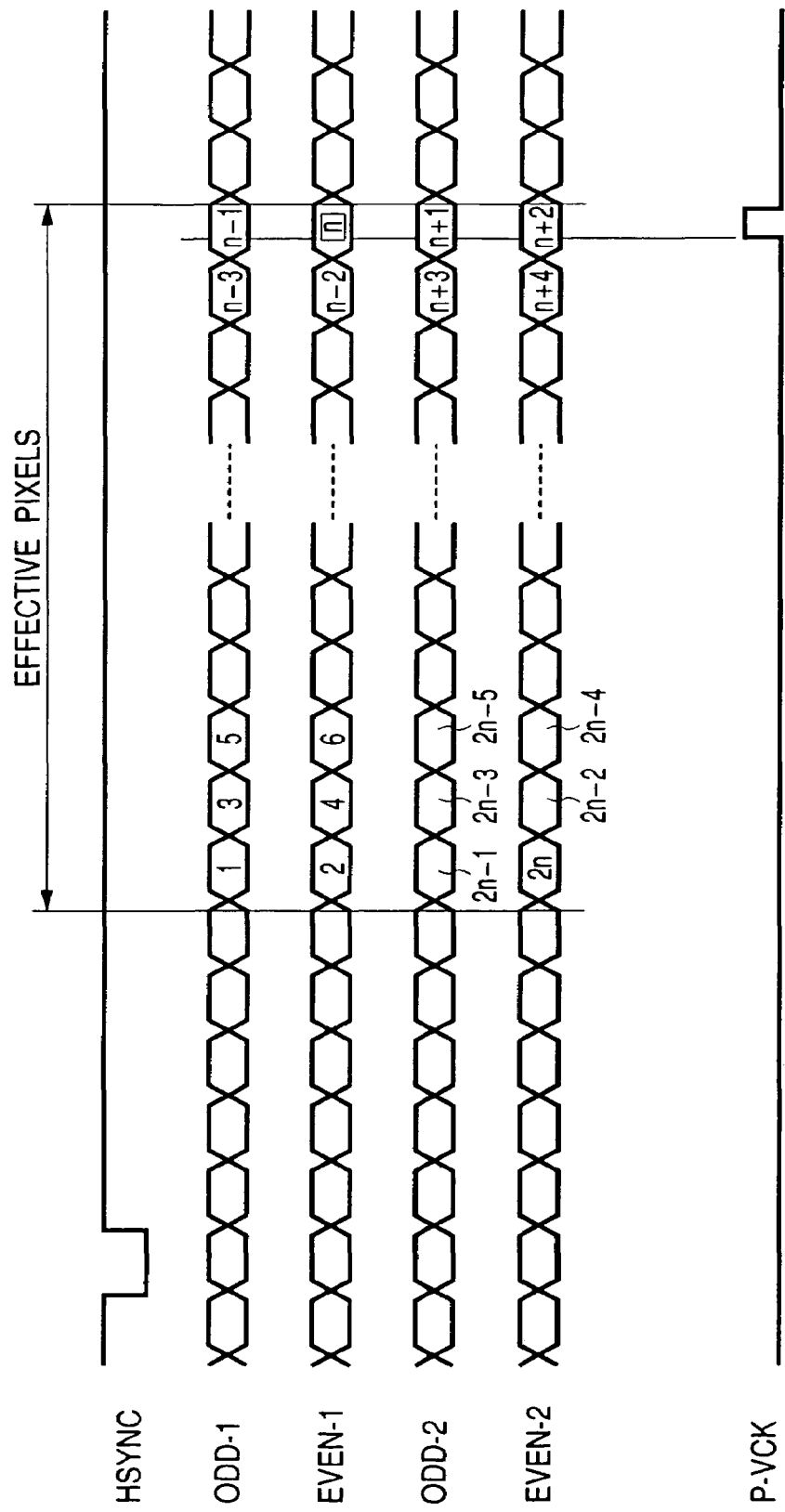
FIG. 10 is a diagram showing image signals output from a right/left division read type CCD sensor.

FIG. 10 shows pixel signals output from the image sensor 208 and processed by the black offset and shading correction circuits 609 to 612.

In FIG. 10, HSYNC represents a line sync signal. A leading edge position signal P-VCK defines a timing when image signals at the boundary along which the light receiving pixel array 301 of the image sensor 208 is divided into the right and left pixel subarrays 301R and 301L. Pixel signal numbers 1 to 2n represent the order of reading pixel signals.

As shown in FIG. 10, the pixel signals ODD-1 and EVEN-1 are alternately read from the left pixel subarray 301L of the image sensor 208 sequentially in the order of 1st, 2nd, . . . , to the n-th pixel of the left pixel subarray 301L. Similarly, the pixel signals ODD-2 and EVEN-2 are alternately read from the right pixel subarray 301R sequentially in the order of (n+1)-th, (n+2)-th, . . . , to the 2n-th pixel. In this manner, effective pixel data of one line can be obtained.

Since the pixel signals are read in the above-described order, consecutive (n−1)-th to (n+2)-th pixel signals ODD-1, EVEN-1, ODD-2 and EVEN-2 can be obtained at the leading edge position P-VCK. The halfway correction to be described later is executed by using these (n−1)-th to (n+2)-th pixel signals. These signals are obtained from an image of at adjacent positions in an original, since it can be presumed that the original levels of these signals are approximately equal.

Pixel signals other than the (n−1)-th to (n+2)-th pixel signals may also be used with similar advantageous effects of this embodiment if those pixel signals are obtained from an area near to the boundary between the right and left pixel subarrays 301R and 301L of the light receiving array 301.

Figure 11A:
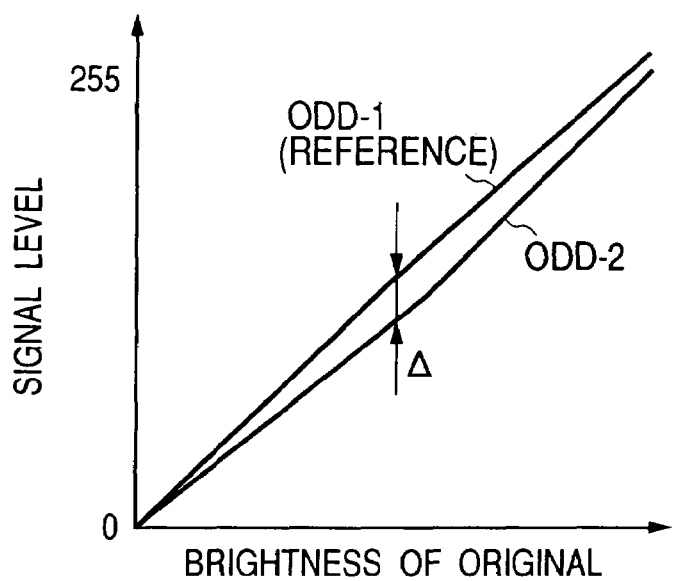
FIGS. 11A and 11B are graphs showing a relation between an original brightness (abscissa) and a signal level (ordinate) of each of output pixel signals ODD-1 and ODD-2 according to the third embodiment.
Figure 11B:
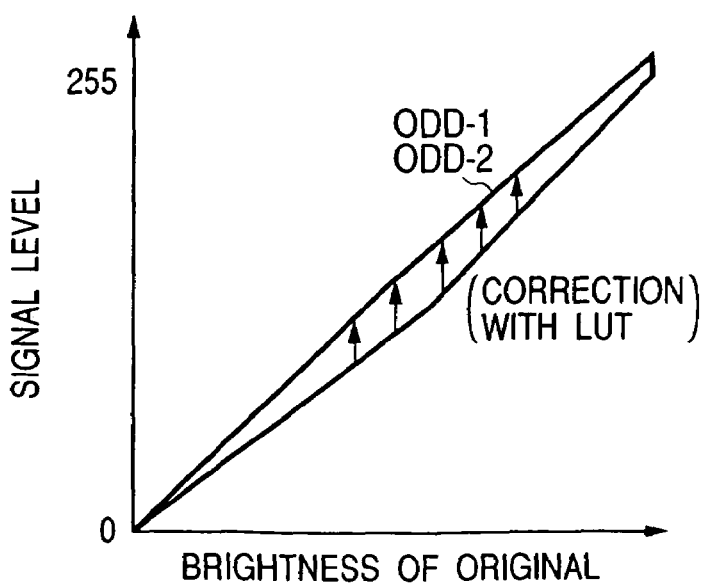

FIGS. 11A and 11B are graphs showing the relation between an original brightness (abscissa) and a signal level (ordinate) of each of the output pixel signals ODD-1 and ODD-2. FIG. 11A shows signal levels before the halfway correction, and FIG. 11B shows the signal levels after the halfway correction of the pixel signals ODD-2 relative to the pixel signals ODD-1.

As shown in FIG. 11A, the pixel signals ODD-1 and ODD-2 are converted into digital signals after passing through different series of circuits such as the output amplifiers 306 and 307. Therefore, even if an original has the same brightness, there is a small difference between the levels of read pixel signals (A shown in FIG. 11A). In this embodiment, by using the pixel signal ODD-1 as a reference channel, the halfway correcting circuit 614 changes the level of the pixel signal ODD-2 to make it have the same level as that of the pixel signal ODD-1. Similarly, the halfway correcting circuits 613 and 615 change the levels of the pixel signals EVEN-1 and EVEN-2 to make them have the same level as that of the pixel signal ODD-1.

Halfway correction by the halfway correcting circuits 613 and 615 is performed by using the look-up tables LUT-2, LUT-3 and LUT-4. The contents of each of the look-up tables LUT-2, LUT-3 and LUT-4 are set by a look-up table (LUT) setting process to be later described.

Figure 12:
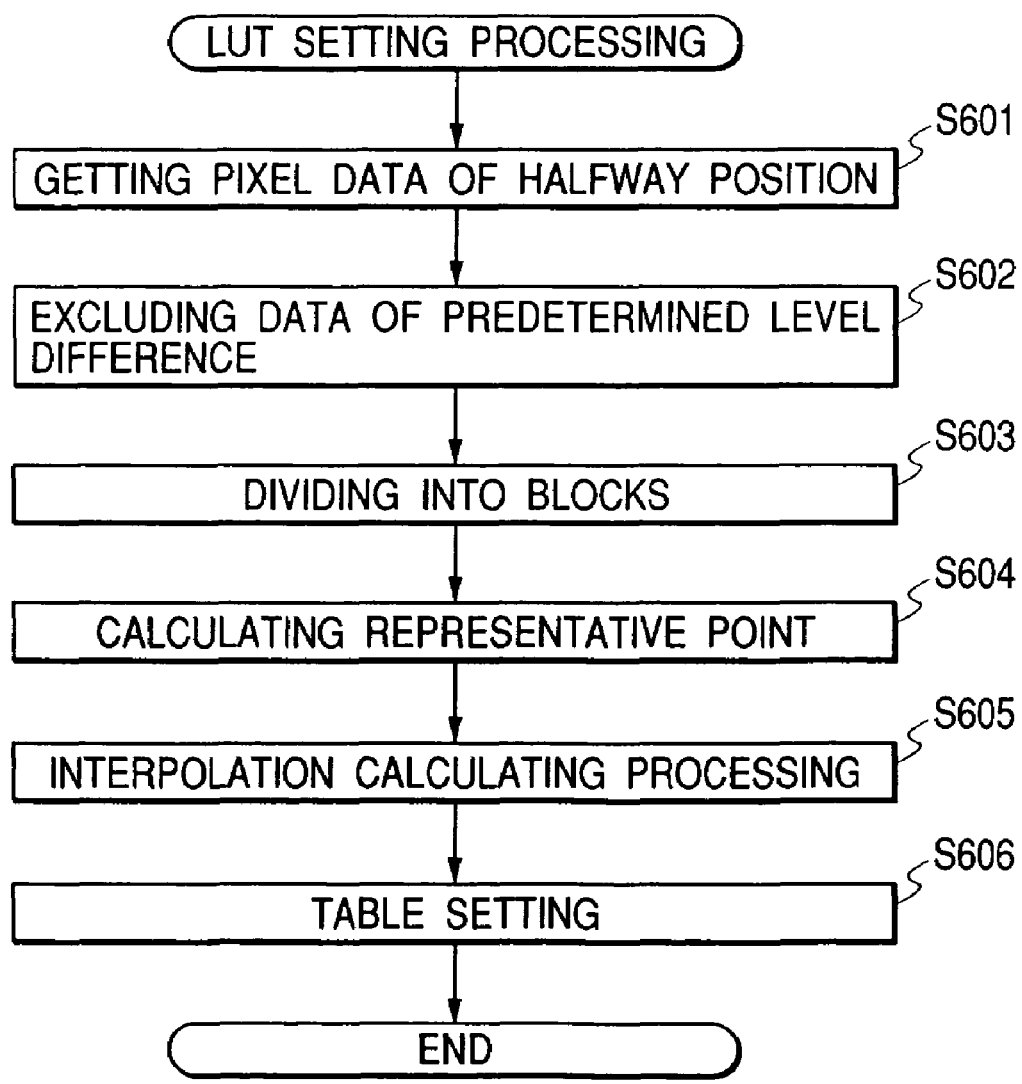
FIG. 12 is a flow chart illustrating a look-up table (LUT) setting process according to the third embodiment.

FIG. 12 is a flow chart illustrating the operation of the look-up table (LUT) setting process. The process of setting the contents of the look-up table LUT-3 for adjusting the level of the pixel signal ODD-2 by using the pixel signal ODD-1 as a reference channel, will be described by way of example. Similar processes are also executed for setting the contents of the look-up tables LUT-2 and LUT-4 for adjusting the levels of the pixel signals EVEN-1 and EVEN-2 by using the pixel signal ODD-1 as the reference channel.

First, pixel data at the halfway position is obtained (Step S601). Namely, pixel data at the leading edge position P-VCK shown in FIG. 10 and stored in the memory 618 during reading the original is read. The pixel data is read a plurality of times while the original is read.

Figure 13:
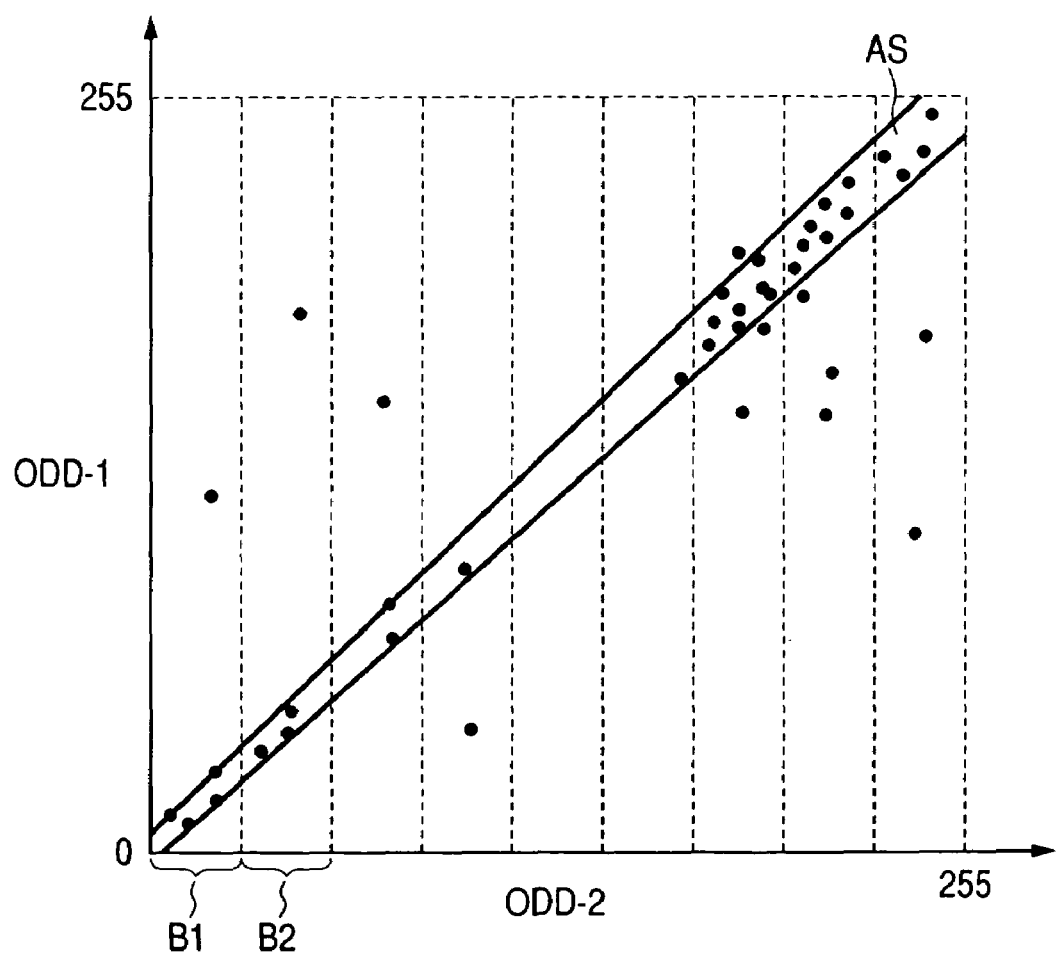
FIG. 13 is a graph showing a relation between signal levels of output pixel signals ODD-1 and ODD-2 at a halfway position according to the third embodiment.

FIG. 13 is a graph showing a relation of signal levels between the pixel signals ODD-1 and ODD-2 at the halfway position read in the manner described above.

Next, at Step S602 shown in FIG. 12, pixel data having a level difference larger than a predetermined level is excluded from the later calculation. Namely, pixel data in an area AS shown in FIG. 13 is used as effective data, and pixel data outside of this area AS is not used for the later calculation. Temporarily abnormal data is therefore prevented from affecting a level correction. This area AS may be set by taking a level difference normally experienced into consideration.

Next, at Step S603 shown in FIG. 12, a signal level area is divided into a plurality of blocks B (such as B1 and B2) in accordance with a signal level of the pixel signal ODD-2 as shown in FIG. 13.

Next, a representative point in each block is calculated at Step S604. Namely, in the area AS of each block an average value AV-ODD-1 of pixel data ODD-1 and an average value AV-ODD-2 of pixel data ODD-2 are calculated and a point defined by the average values AV-ODD-1 and AV-ODD-2 is used as the representative point. This representative point corresponds to a ratio of the average value AV-ODD-2 to the average value AV-ODD-1. If the number of data values in the area AS in each block B is smaller than a predetermined number (e.g., 2), the representative point in this block B is invalidated to avoid erroneous correction.

Next, at Step S605 an interpolation calculating process is executed. Namely, a curve representative of a relation between the pixel signals ODD-1 and ODD-2 in the whole signal level area is calculated from the obtained representative points with a known interpolation calculation. By using this curve, the relation between the pixel signals ODD-1 and ODD-2 is presumed. With respect to a block without the representative point, the interpolation calculation is performed by using the representative points in adjacent blocks B.

Figure 14:
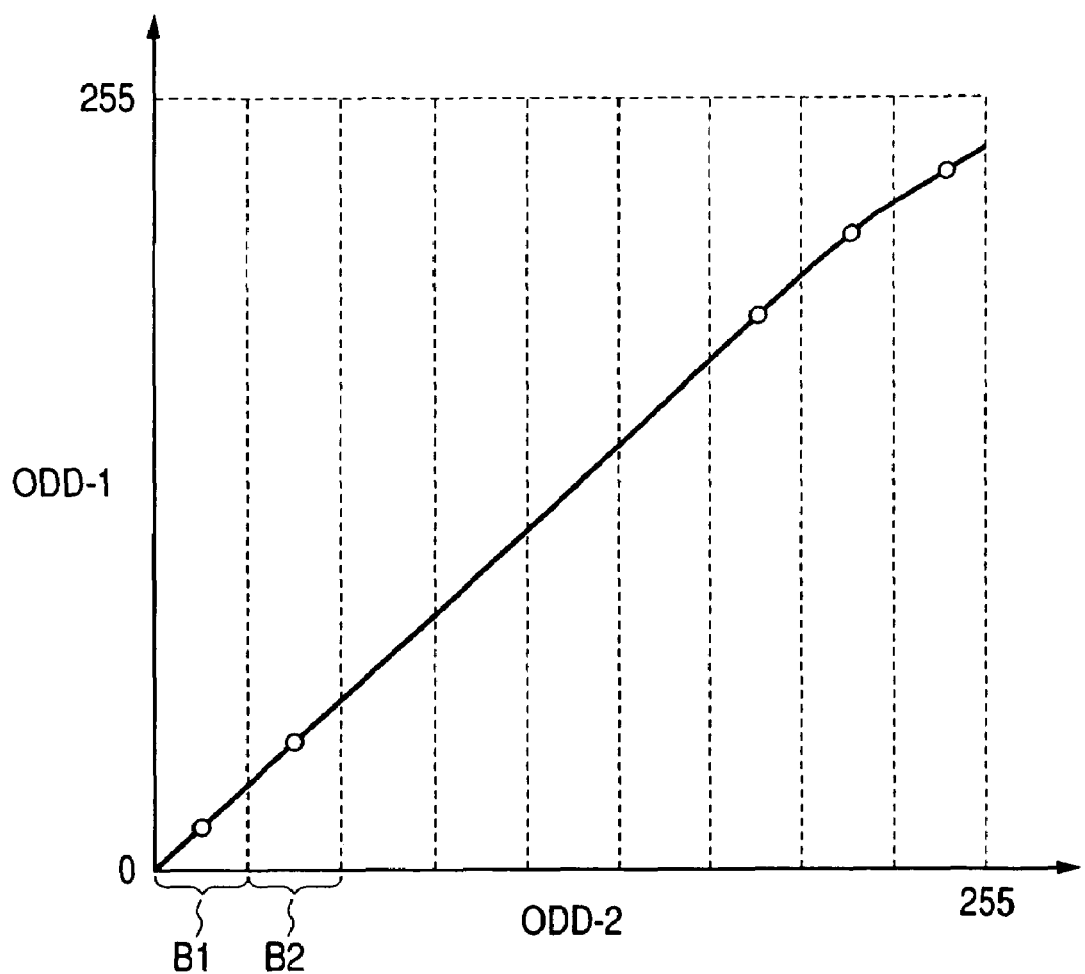
FIG. 14 is a graph showing a relation between signal levels of pixel signals OFF-1 and ODD-2 calculated by using representative points and interpolation according to the third embodiment.

FIG. 14 shows an example of a curve representative of the relation between the pixel signals ODD-1 and ODD-2 calculated from the representative points and interpolation calculation. As shown, a relation between the pixel signals ODD-1 and ODD-2 is obtained in the whole signal level area.

Next, at Step S606 the contents of the look-up table LUT-3 are set. Namely, in accordance with the curve representative of the relation between the pixel signals ODD-1 and ODD-2, the contents of the look-up table LUT-3 are determined and set to the halfway correcting circuit 614.

Figure 15:
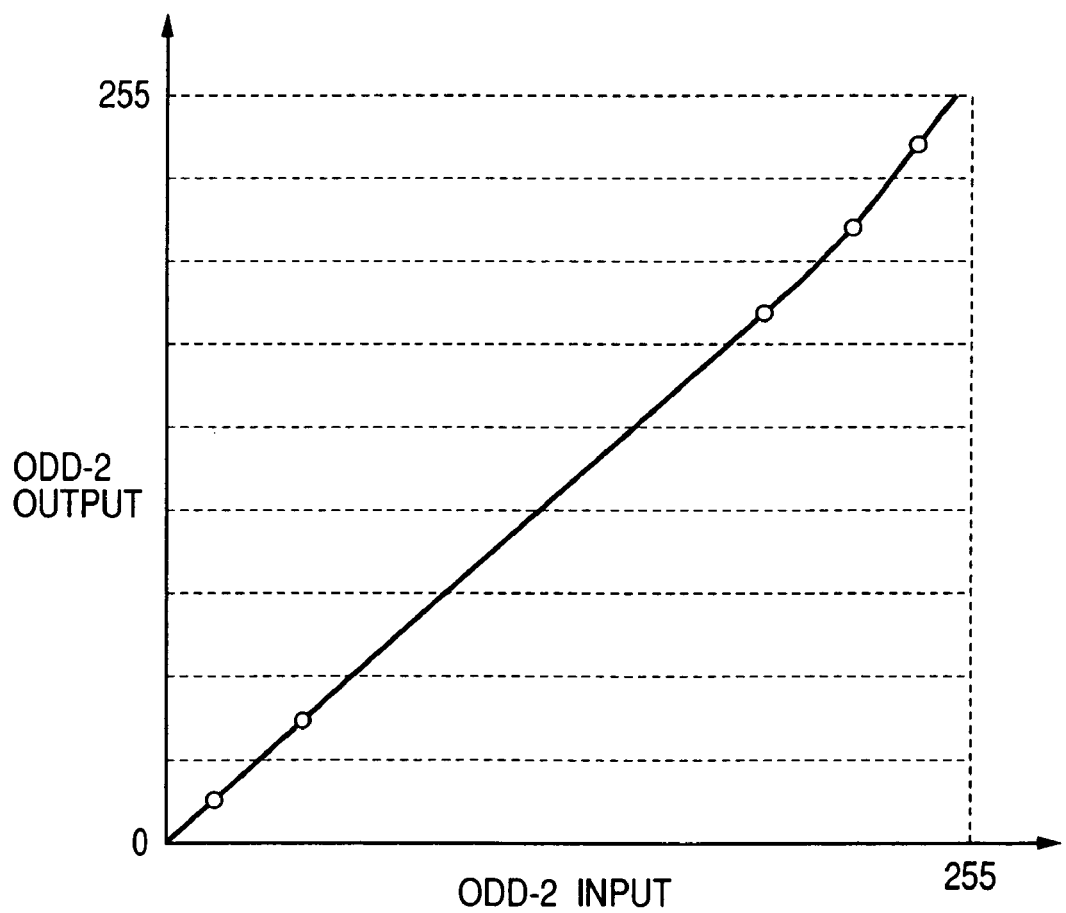
FIG. 15 is a graph showing an example of the contents of a look-up table LUT-3 according to the third embodiment.

FIG. 15 shows an example of the contents of the look-up table LUT-3. This table LUT-3 indicates how the level of an actual pixel signal ODD-2 (input) is adjusted in each level area to make it have the same level as that of the pixel signal ODD-1. Therefore, the level of the pixel signal ODD-2 supplied from the black off-set shading correction circuit 611 and output from the halfway correcting circuit 614 can be uniquely determined by the table LUT-3.

Thereafter, the LUT setting process is terminated.

In this embodiment, in the image input apparatus, the light receiving pixel array of the linear CCD image sensor 208 is divided into a plurality of areas to read pixel signals from each area. By using an output pixel signal ODD-1 as a reference, the levels of other output pixel signals (ODD-2, EVEN-1 and EVEN-2) are adjusted to make them have the same level as the of the reference output pixel signal. It is therefore possible to remove a difference in signal levels between areas and prevent an unnatural quality of an image. Since the signal level is adjusted by using pixel signals at the halfway position in each area, i.e., pixel signals in an area near the boundary where a difference in signal level is generated, this level difference can be effectively avoided from becoming visually conspicuous. Since the representative point is calculated in each of a plurality of blocks B divided in accordance with a signal level, the signal level adjusting process becomes simple.

Data outside of the area AS is excluded from those data used by the look-up table setting process, and if the number of data values in the area AS in each block B is smaller than a predetermined number, the representative point in the block B is not calculated. Accordingly, an erroneous signal level adjustment can be avoided and the adjustment precision can be improved. Furthermore, the relation (ratio) between the pixel signal ODD-1 and other pixel signals ODD-2, EVEN-1 and EVEN-2, including the block B without the representative point, is obtained by an interpolation calculation. It is therefore possible to adjust the level in the whole level area.

A pixel signal to be used as the reference is not limited only to the pixel signal ODD-1, but any one of the pixel signals ODD-2, EVEN-1 and EVEN-2 may also be used as the reference. For example, the levels of the pixel signals ODD-1, EVEN-1 and EVEN-2 may be adjusted by using the pixel signal ODD-2 as the reference.

As described earlier, even if there is a signal level difference between the pixel signals EVEN-1 and ODD-1, only a very fine repetitive pattern appears on an image and this pattern is not visually conspicuous. Therefore, by using the pixel signal ODD-1 as the reference, the levels of only the pixel signals ODD-2 and EVEN-2 may be adjusted. From the same reason, the level of the pixel signal ODD-2 may be adjusted by using the pixel signal ODD-1 as the reference and the level of the pixel signal EVEN-2 is adjusted by using not the pixel signal ODD-1 but the pixel signal EVEN-2 as the reference.

In this embodiment, although the light receiving pixel array is divided into right and left pixel subarrays, the invention is not limited only thereto but the pixel array may be divided into more subarrays.

In the third embodiment described above, the look-up table is updated each time an original is read so that this update depends greatly upon the original read immediately before. In a fourth embodiment of the invention, in order to avoid this inconvenience, the look-up table is partially updated. The structure of the fourth embodiment is therefore different from the third embodiment only in the table setting process at Step S606 shown in FIG. 12, and the other structures are the same as the third embodiment.

Figure 16A:
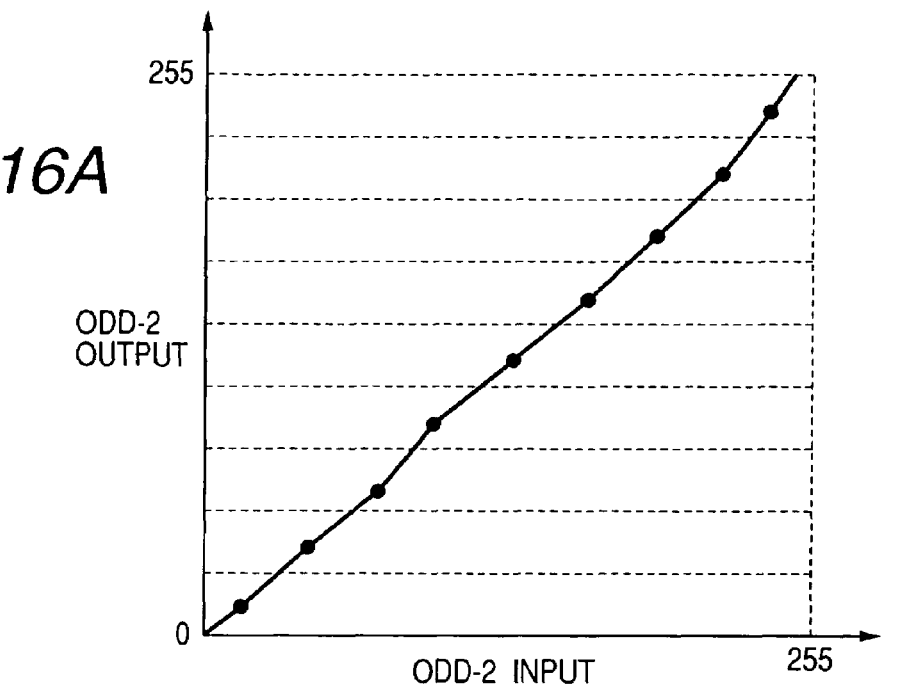
FIGS. 16A and 16B are graphs showing an example of the contents of a look-up table LUT-3 according to a fourth embodiment of the invention.
Figure 16B:
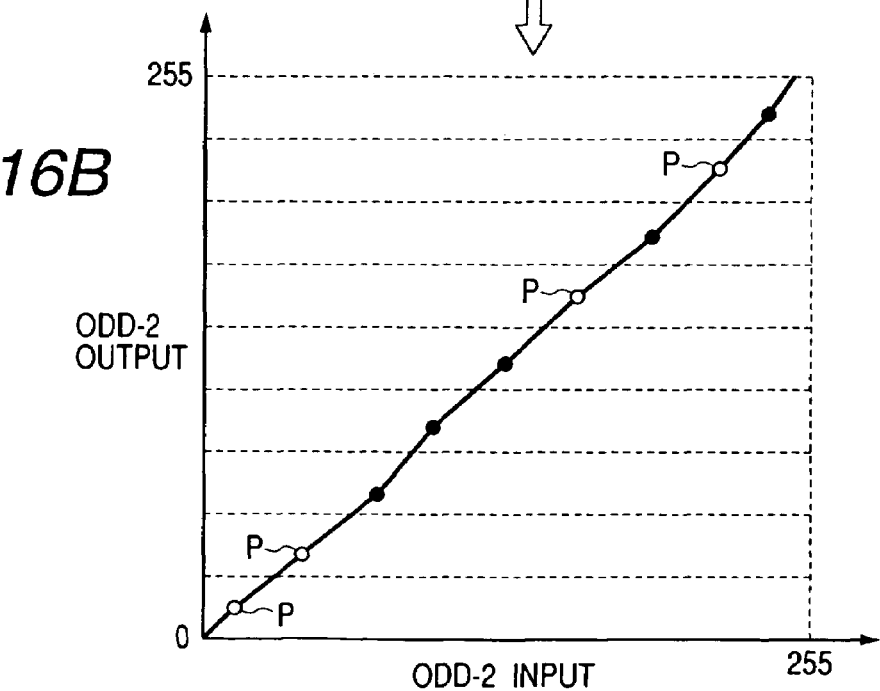

FIGS. 16A and 16B show examples of the contents of the look-up table LUT-3 of the fourth embodiment. FIG. 16A is the table before updating, and FIG. 16B is the table after updating.

As described earlier, the representative point cannot necessarily be obtained from all blocks B. By using only new representative points obtained from blocks B, the table setting process is executed. By simply replacing old representative points by new representative points, the contents of the look-up table LUT-3 are determined through the interpolation calculation. Points p shown in FIG. 16B are updated representative points. Similar operations are performed for the look-up tables LUT-2 and LUT-4.

The representative points may be updated by a calculation process (e.g., weighted linear calculation) between old and new representative points.

In this embodiment, it is possible to suppress the influence of an original read immediately before when the look-up table is set. Advantageous effects similar to the third embodiment can be obtained and more proper halfway correction becomes possible.

Figure 17:
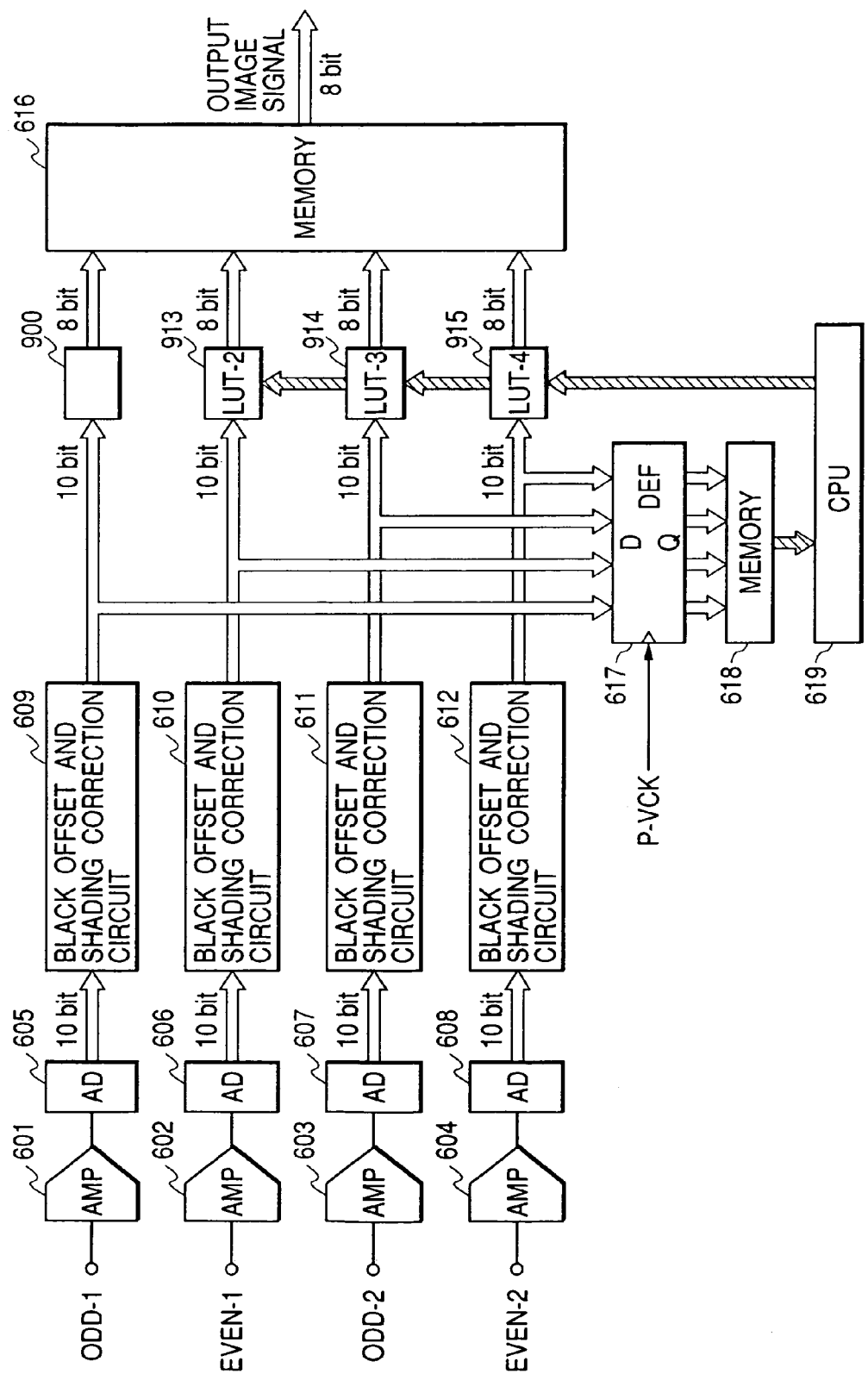
FIG. 17 is a diagram showing the structure of a reader unit of an image input apparatus according to a fifth embodiment of the invention.

FIG. 17 is a block diagram showing a processing unit of an image input apparatus according to a fifth embodiment of the invention. Although the structure of the image input apparatus of this embodiment is fundamentally similar to the third embodiment, the following points are different. A halfway correcting circuit 900 is provided between the black offset and shading correction circuit 609 and memory 616, and the halfway correcting circuits 613 to 615 are replaced by halfway correcting circuits 913 to 915. The halfway correcting circuits 913 to 915 not only execute halfway correction similar to the halfway correcting circuits 613 to 615 but also execute conversion (bit conversion) of the number of gradation steps of an image.

Specifically, signals of 10 bits are supplied from the black offset and shading correction circuits 610 to 612 to the halfway correcting circuits 913 to 915 which in turn convert the signals of 10 bits into signals of 8 bits and store them in the memory 616. A signal of 10 bits is supplied from the black offset and shading correction circuit 609 to the halfway correcting circuits 900 which in turn cuts the lower 2 bits and stores the upper 8 bits in the memory 616.

Therefore, while the halfway correction is executed at the large number of gradation steps (10 bits) to retain a high precision of the halfway correction, the post-process is executed at the small number of gradation steps (8 bits) to reduce a load of the apparatus. A combination of 10 bits and 8 bits is not limited so long as the number of gradation steps before halfway correction is larger than that after the halfway correction.

In this embodiment, advantageous effects similar to the third embodiment can be obtained and a load of the image input apparatus can be reduced while a high signal level adjustment precision is retained.

In the third to fifth embodiments, although a linear CCD image sensor 208 of a CCD type is used, other image sensors such as an image sensor of a MOS type may also be used.

It is obvious that the object of the invention can be achieved by supplying the image input apparatus with a storage medium storing software program codes realizing the functions of each embodiment described above, and by reading and executing the programs codes stored in the storage medium by a computer (CPU or MPU) of the image input apparatus.

In such a case, the program codes themselves read from the storage medium realize the functions of each embodiment. Therefore, the storage medium storing such program codes constitutes the present invention.

The storage medium for storing such program codes may be a floppy disk, a hard disk, an optical disk, a magnetooptical disk, a CD-ROM, a CD-R, a magnetic tape, a nonvolatile memory card, a ROM or the like.

It is obvious that the scope of the invention also contains not only the case wherein the functions of each embodiment can be realized by executing the program codes read by a computer, but also the case wherein the functions of each embodiment can be realized by executing a portion or the whole of processes by an OS running on the computer, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

A sixth embodiment of the invention provides an image input system using an image input apparatus of one of the above-described first to fifth embodiments.

Figure 18:
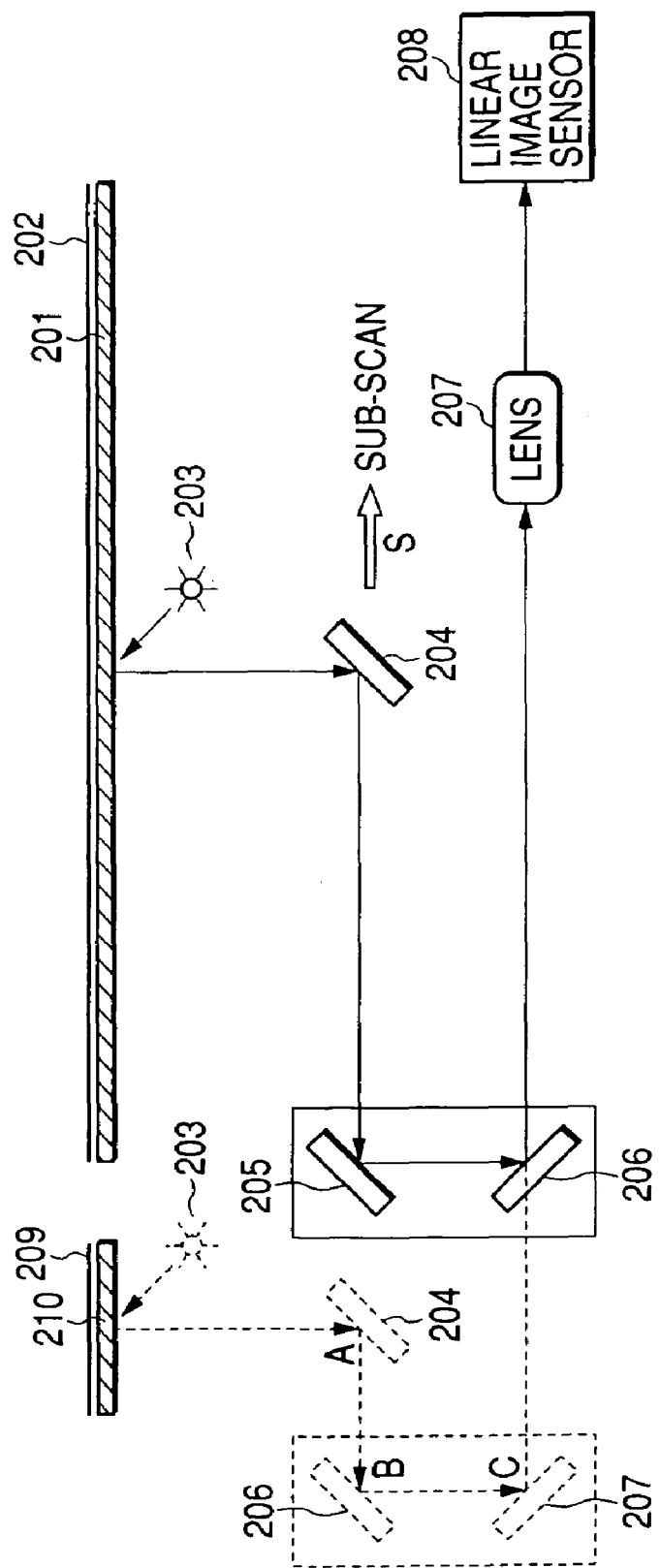
FIG. 18 is a diagram showing the structure of an image input system according to a sixth embodiment of the invention.

Referring to FIG. 18, reference numeral 201 represents an original support glass, reference numeral 202 represents an original, and reference numeral 203 represents an illumination lamp for illuminating an original. Reference numeral 207 represents a lens for focussing an original image on a light receiving surface of the linear image sensor 208 of one of the first to fifth embodiments. Reference numerals 204 to 205 represent first to third mirrors for guiding light reflected from the original to the lens 207. Reference numeral 209 represents a white board which is read as a reference of the shading correction process. Reference numeral 210 represents a dummy glass for making the optical distance from the linear image sensor 208 to the white board surface equal to that to the original surface.

While the original is read, the mirrors move in the sub-scan direction so that the original can be read two-dimensionally.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus comprising:
  a photoelectric conversion unit adapted to acquire image information of an object from a plurality of divided areas and to separately output signals from each of a plurality of channels, wherein each of the channels include a plurality of effective pixels and a plurality of non-image pixels; and
  a correcting unit adapted to correct offset components contained in the signals output from each of the channels during a period of acquiring the image information, in accordance with a first signal output from the plurality of effective pixels during a period other than the image information acquiring, a second signal output from the plurality of non-image pixels during the period other than the image information acquiring, and a third signal output from the plurality of non-image pixels during the period of acquiring image information,
  wherein said correcting unit includes:
  a subtracting unit adapted to subtract the offset components from the signals output from the plurality of channels of said photoelectric conversion unit during the period of acquiring the image information;
  a calculating unit adapted to calculate the fluctuation of the offset components in accordance with the second and third signals; and
  an adjusting unit adapted to adjust the offset components to be subtracted by said subtracting unit, in accordance with an output signal from said calculating unit.

2. An image input apparatus according to claim 1, wherein the signals from the plurality of channels are output separately to right and left directions respectively.

3. An image input apparatus according to claim 1, wherein the offset components include a level difference of the signals between the channels.

4. An image input apparatus according to claim 1, wherein the first, second, and third signals are obtained through addition of signals of the channels and averaging thereof.

5. An image input apparatus according to claim 1, wherein adjusting of the offset components by said adjusting unit is executed during a period other than the image information acquiring.

* * * * *

UNITED STATES PATENT AND TRADEMARK OFFICE
CERTIFICATE OF CORRECTION

PATENT NO. : 7,053,941 B1  Page 1 of 1
APPLICATION NO. : 09/639082
DATED : May 30, 2006
INVENTOR(S) : Kazuhito Ohashi It is certified that error appears in the above-identified patent and that said Letters Patent is hereby corrected as shown below:

ON TITLE PAGE AT (56) FOREIGN PATENT DOCUMENTS

"10065973" should read --10-065973--; and
"10336529" should read --10-336529--.

COLUMN 8

Line 29, "(A" should read --(Δ--.

Signed and Sealed this

Eighteenth Day of March, 2008

JON W. DUDAS
*Director of the United States Patent and Trademark Office*